J. H. GRAVELL.
CHEMICAL WELDING.
APPLICATION FILED OCT 20, 1917.

1,355,224.

Patented Oct. 12, 1920.

INVENTOR
James H. Gravell.
BY
Townsend & Decker
ATTORNEYS

UNITED STATES PATENT OFFICE.

JAMES H. GRAVELL, OF BROOKLYN, NEW YORK, ASSIGNOR TO THOMSON SPOT WELDER COMPANY, OF BOSTON, MASSACHUSETTS, A CORPORATION OF MASSACHUSETTS.

CHEMICAL WELDING.

1,355,224.  Specification of Letters Patent.  Patented Oct. 12, 1920.

Application filed October 20, 1917. Serial No. 197,544.

*To all whom it may concern:*

Be it known that I, JAMES H. GRAVELL, a citizen of the United States, and a resident of Brooklyn, in the county of Kings and State of New York, have invented certain new and useful Improvements in Chemical Welding, of which the following is a specification.

This invention relates to the welding of sheets or plates of metal together by their opposed surfaces and is especially useful in forming isolated welds similar to what are known technically as "spot welds".

The object of the invention is to simplify and cheapen the joining of sheets or plates of metal together and to enable "spot welding" to be practised more universally and without the necessity of special and expensive machinery.

Generally stated the invention consists in providing a chemical substance which when ignited generates a high temperature very rapidly so that the surface or surfaces of metal in contact with the substance is immediately raised to a welding temperature at which time localized pressure is applied to the heated section to complete the weld. When this substance is placed between sheets of metal and ignited the opposing surfaces in contact with the substance are instantly brought to a welding temperature and when forced together extrude the welding substance or material and contact with each other and, being at a high temperature, weld together. If desired, especially in the case of thin metal, the substance may be placed on the outer surface.

Although many substances have a property of generating a high heat instantly I prefer to use the substance known as "Thermit", which consists of a mixture of black iron oxid and powdered aluminum. When this substance is ignited a very high temperature is produced and the substance changes into molten metal and aluminum oxid at a very high temperature.

The invention consists in the new method of welding sheets or plates of metal together by means of a capsule or tablet as hereinafter more particularly described and then specified in the claims.

In the accompanying drawings I illustrate more or less diagrammatically various forms of capsules or tablets which may be used in practising the invention and also some ways of applying them to the work to be welded.

Figure 1:
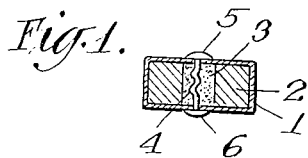
Figures 1, 2, 3 and 4 illustrate cross-sections, on a greatly enlarged scale, through different forms of capsules or cartridges for use with this invention.

Figs. 8 to 12 inclusive illustrate various manners of applying the capsules or cartridges to the work.

The invention may be practised in a number of ways to unite pieces of metal together at spots. In one manner I charge a capsule or cartridge with the welding material and provide means of igniting it. In another I provide a tablet made by compressing the heat generating material with a binder and associate igniting means of any suitable character with it.

In Figs. 1, 2, 3 and 4 the heat generating material 2 is sealed in a capsule or cartridge 1 of any suitable material of sufficient thickness and strength to hold the material and which preferably will volatilize when the material is ignited. In the form shown in Fig. 1 a lighting powder 3 is placed in the body of the mass of heat generating material or welding substance 2, and through the lighting powder a fine wire 4 passes. The wire 4 is provided with terminals 5 and 6 on the outside of the capsule.

Figure 8:
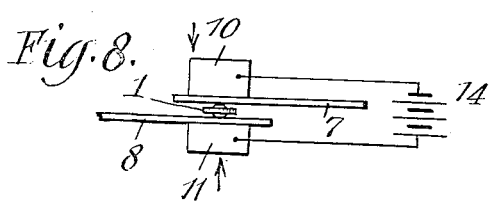

The capsule is inserted between two sheets of metal 7, 8 as indicated in Fig. 8 and in line therewith two electrodes or blocks 10 and 11 are placed on the outside of the sheets. These electrodes are in the circuit of a battery or other source of current 14. Current from the battery passing through the fine wire 4 ignites the welding substance due to the chemical action set up therein. The metal of the sheets 7 and 8 in contact with the ignited substance immediately rises to a welding temperature and pressure is applied to the blocks 10 and 11 in any suitable manner. When the pressure is applied the material of the capsule or a large part of it is extruded from between the sheets.

Figure 2:
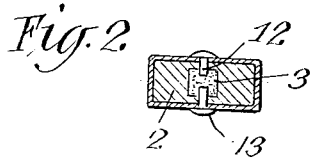

In the form of capsule shown in Fig. 2 the fine wire 4 is replaced by two terminals 12 and 13 across which a high tension spark is passed to ignite the powder 3. This capsule may be used in the same manner as shown in Fig. 8 except an induction coil is added in the circuit to produce the required spark between the terminals 12 and 13.

Figure 3:
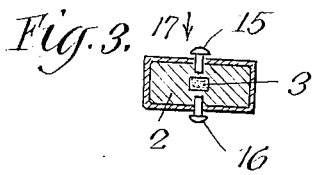
Figure 4:

In Fig. 3 two rods 15 and 16 enter the capsule and explode or ignite the ignition powder or fulminate 3 by a sudden blow on the rods in the direction of the arrow 17. As indicated in Fig. 4 the ignition powder may be mixed directly with the welding substance 2 in which case a sudden blow against the capsule ignites the mass of welding substance. One manner of using the forms of capsules shown in Figs. 3 and 4 is diagrammatically indicated in Fig. 9, the pieces to be joined merely resting on a support or anvil 20 and the capsule 1 ignited by a blow of the hammer 21 on the outside of the sheet 7. A subsequent blow or blows of the hammer may be used to apply the necessary pressure to complete the weld.

Figure 5:
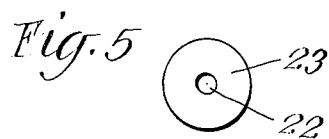
Figs. 5, 6 and 7 illustrate a form of tablet to be used for the same purpose.
Figure 6:
Figure 7:
Figure 10:
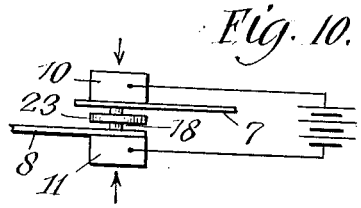

If desired the use of a containing capsule or cartridge may be dispensed with. To do this I mix the welding substance with a binder such as sodium silicate and mold the mixture into any desired size tablet 23 as shown in Figs. 5 and 6. Preferably I provide these tablets with a central hole 22 in which is located a metal plug 18 of slightly greater length than the thickness of the tablet so as to project beyond preferably both surfaces of the tablet as shown in Fig. 7. This tablet is placed between the sheets to be joined as indicated in Fig. 10, the process then being the same as described in connection with Fig. 8, the metal plug 18 serving to conduct the current from one electrode to the other and in so doing becomes white hot, igniting the welding substance.

I also may make the tablet of such material that it will ignite when given a blow in which case the metal plug 18 is dispensed with and the process of uniting the metal with this tablet being similar to that described in connection with Fig. 9.

Figure 11:
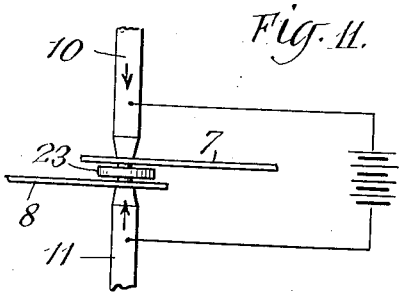

Again, if desired, I may mix the welding substance with metal filings or turnings so that the tablet will conduct current and in so doing raise the tablet to igniting temperature. The use of this form of tablet is shown in Fig. 11, the steps being the same as described in connection with Fig. 8.

Figure 12:
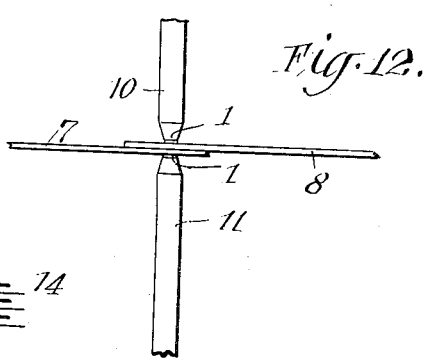

If desired and especially when the sheets of metal are thin I may place the capsules or tablets on the outside of one or both of the sheets to be joined as indicated in Fig. 12.

It will be understood that in the drawings, for purposes of clearness of illustration, the size of the capsules and parts are shown exaggerated and not in correct proportion.

Figure 9:
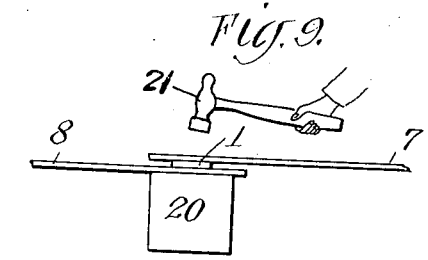

As will be evident from the foregoing description the process may be used where it is not convenient to obtain the electric current necessary to electrically weld as now practised and as the chemicals are inexpensive the process is very cheap, the only apparatus required in some cases being an anvil and a hammer as indicated in Fig. 9. Also the facility with which the pieces can be joined in accordance with some of the forms or my invention will be evident; the capsules or tablets can be supplied and used in practically the same manner as tacks or nails.

It will be understood that the invention is capable of various modifications and developments not herein specifically described but within the scope thereof as set forth in the appended claims.

The invention claimed is:—

1. The method of welding two pieces of metal together consisting in placing a chemical substance capable of generating intense heat between opposing surfaces of the metal pieces, passing an electric current from one surface to the other through the substance thereby igniting it and forcing the surfaces together at the heated section.

2. The method of welding opposed plates to each other, consisting in placing between opposed surfaces a chemical substance capable of generating intense heat and containing an igniter, passing an electric current to actuate the igniter whereby said substance is ignited and heats the section of work in contact therewith to welding temperature and applying pressure to the heated section of work to weld the surfaces to each other.

3. The method of spot welding two plates of metal consisting in localizing the heat to a spot or portion only of opposed surfaces of the plates by a heat generating chemical substance and applying a localized pressure immediately over the heated spot to effect the welding of said plates at a spot only of their opposed surfaces.

4. The method of spot welding, consisting in superposing two pieces of metal, applying a capsule or cartridge containing a mass of material having a capacity for producing intense heat, igniting said capsule and applying localized pressure to the heated section.

5. The method of spot welding, consisting in superposing two plates of metal, inserting a capsule containing a mass of material having a capacity for producing intense heat between said plates, passing an electric current through said capsule to ignite the material and applying localized pressure to the heated section.

Signed at New York, in the county of New York and State of New York, this 19th day of October, A. D. 1917.

JAMES H. GRAVELL.

Witnesses:
F. B. TOWNSEND,
IRENE LEPKOWITZ.